United States Patent
Tran

(10) Patent No.: US 12,026,369 B2
(45) Date of Patent: Jul. 2, 2024

(54) CONFIGURABLE FLASH MEMORY PHYSICAL INTERFACE IN A HOST DEVICE

(71) Applicant: QUALCOMM INCORPORATED, San Diego, CA (US)

(72) Inventor: Sang Tran, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 17/966,450

(22) Filed: Oct. 14, 2022

(65) Prior Publication Data

US 2024/0126431 A1 Apr. 18, 2024

(51) Int. Cl.
*G06F 3/06* (2006.01)

(52) U.S. Cl.
CPC .......... *G06F 3/0604* (2013.01); *G06F 3/0629* (2013.01); *G06F 3/0679* (2013.01)

(58) Field of Classification Search
CPC ..... G06F 3/0604; G06F 3/0629; G06F 3/0679
See application file for complete search history.

(56) References Cited

U.S. PATENT DOCUMENTS

| | | | |
|---|---|---|---|
| 10,114,555 B2 | 10/2018 | Chang et al. | |
| 10,262,705 B2 | 4/2019 | Choi | |
| 11,086,566 B2 | 8/2021 | Seong et al. | |
| 11,348,623 B2 | 5/2022 | Cho et al. | |
| 2015/0052266 A1 | 2/2015 | Hershko et al. | |
| 2015/0220140 A1* | 8/2015 | Por | G06F 1/266 710/314 |
| 2017/0286357 A1* | 10/2017 | Chellappan | G06F 13/4291 |
| 2020/0090020 A1 | 3/2020 | Fujimoto et al. | |
| 2021/0209038 A1 | 7/2021 | Ono et al. | |
| 2021/0374079 A1* | 12/2021 | Shin | G06F 13/382 |
| 2022/0222011 A1 | 7/2022 | Choi et al. | |

OTHER PUBLICATIONS

Related PCT App. Ser. No. PCT/US2023/032779, Filed Sep. 14, 2023, entitled, "Configurable Flash Memory Physical Interface in a Host Device," International Search and Written Opinion issued on Dec. 5, 2023, 9 pages.

* cited by examiner

*Primary Examiner* — Eric Cardwell
(74) *Attorney, Agent, or Firm* — Smith Tempel Blaha LLC/Qualcomm

(57) ABSTRACT

A flash memory physical interface in a host device may be configured based on a selection signal indicating whether a flash memory system is a first type or a second type. Based on the selection signal, either a first differential memory data signal input of driver circuitry or a second differential memory data signal input of the driver circuitry may be coupled to a differential data input of the flash memory system. Based on the selection signal, a differential data output of the flash memory system may be coupled to either a first differential memory data signal output of receiver circuitry or a second differential memory data signal output of the receiver circuitry.

24 Claims, 12 Drawing Sheets

CONFIGURABLE FLASH MEMORY PHYSICAL INTERFACE IN A HOST DEVICE

DESCRIPTION OF THE RELATED ART

Mobile computing devices such as smartphones commonly include one of two types of flash memory systems as their main memory: Universal Flash Storage ("UFS") and Non-Volatile Memory Express ("NVMe"). Accordingly, a host processing system in some mobile computing devices may be configured to interface with UFS, while a host processing system in other mobile computing devices may be configured to interface with NVMe.

A UFS physical-layer interface or link between a UFS host and a UFS storage device may conform to a protocol known as M-PHY. The M-PHY interface may comprise six signal paths (e.g., wires or other conductors). Two of the conductors form a first differential pair configured to carry data from the UFS host to the UFS storage device, and two of the conductors form a second differential pair configured to carry data from the UFS storage device to the UFS host. The remaining two conductors may be configured to carry a clock signal and a reset signal.

An NVMe physical interface or link between a host and an NVMe storage device may conform to a protocol known as Peripheral Component Interconnect Express ("PCIe"). The PCIe interface may comprise four signal paths (e.g., wires). Two of the conductors form a first differential pair configured to carry data from the host to the NVMe storage device, and two of the conductors form a second differential pair configured to carry data from the NVMe storage device to the host.

A host device, such as a system-on-a-chip ("SoC"), may include only one of the above-described types of physical interface, depending on the computing device the SoC is included in. For example, a first smartphone may include UFS as its flash memory and accordingly include an SoC having an M-PHY flash memory physical interface, while a second smartphone may include NVMe as its flash memory and accordingly include an SoC have a PCIe flash memory physical interface.

SUMMARY OF THE DISCLOSURE

Systems, methods, computer-readable media, and other examples are disclosed for configuring a flash memory physical interface in a host device.

An exemplary system for selectably configuring a flash memory physical interface may include driver circuitry and receiver (buffer) circuitry. The driver circuitry may have a first differential memory data signal input and a second differential memory data signal input. The driver circuitry may also have a driver selector input configured to receive a selection signal indicating one of a first flash memory type and a second flash memory type. The driver circuitry may be configured to couple, based on the selection signal, a selected one of the first differential memory data signal input and the second differential memory data signal input to a differential data input of a flash memory system. The receiver circuitry may be coupled to a differential data output of the flash memory system. The receiver circuitry may have a receiver selector input configured to receive the selection signal. The receiver circuitry may also have a first differential memory data signal output and a second differential memory data signal output. The receiver circuitry may be configured to couple, based on the selection signal, the differential data output of the flash memory system to a selected one of the first differential memory data signal output and the second differential memory data signal output.

An exemplary method for selectably configuring a flash memory physical interface may include providing a selection signal indicating a selected one of a first flash memory type and a second flash memory type. The method may further include coupling, by driver circuitry, one of a first differential memory data signal input and a second differential memory data signal input to a differential data input of a flash memory system based on the selection signal. The method may still further include coupling, by receiver circuitry, a differential data output of the flash memory system to a selected one of a first differential memory data signal output and a second differential memory data signal output based on the selection signal.

Another exemplary system for selectably configuring a flash memory physical interface may include means for providing a selection signal indicating a selected one of a first flash memory type and a second flash memory type. The exemplary system may further include means for coupling one of a first differential memory data signal input and a second differential memory data signal input to a differential data input of a flash memory system based on the selection signal. The exemplary system may still further include means for coupling a differential data output of the flash memory system to a selected one of a first differential memory data signal output and a second differential memory data signal output based on the selection signal.

An exemplary system-on-a-chip or "SorT" may include a processing system configured to direct memory transactions to a flash memory system, memory type selecting logic, and flash memory physical interface configuring logic. The memory type selecting logic may be configured to provide a selection signal indicating whether the flash memory system is a first flash memory type or a second flash memory type. The flash memory physical interface configuring logic may include driver circuitry and receiver (buffer) circuitry. The driver circuitry may have a first differential memory data signal input and a second differential memory data signal input. The driver circuitry may have a driver selector input configured to receive the selection signal. The driver circuitry may be configured to couple, based on the selection signal, a selected one of the first differential memory data signal input and the second differential memory data signal input to a differential data input of the flash memory system. The receiver circuitry may be coupled to a differential data output of a flash memory system. The receiver circuitry may have a receiver selector input configured to receive the selection signal. The receiver circuitry may have a first differential memory data signal output and a second differential memory data signal output. The receiver circuitry may be configured to couple, based on the selection signal, a selected one of the first differential memory data signal output and the second differential memory data signal output to the differential data output of the flash memory system.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
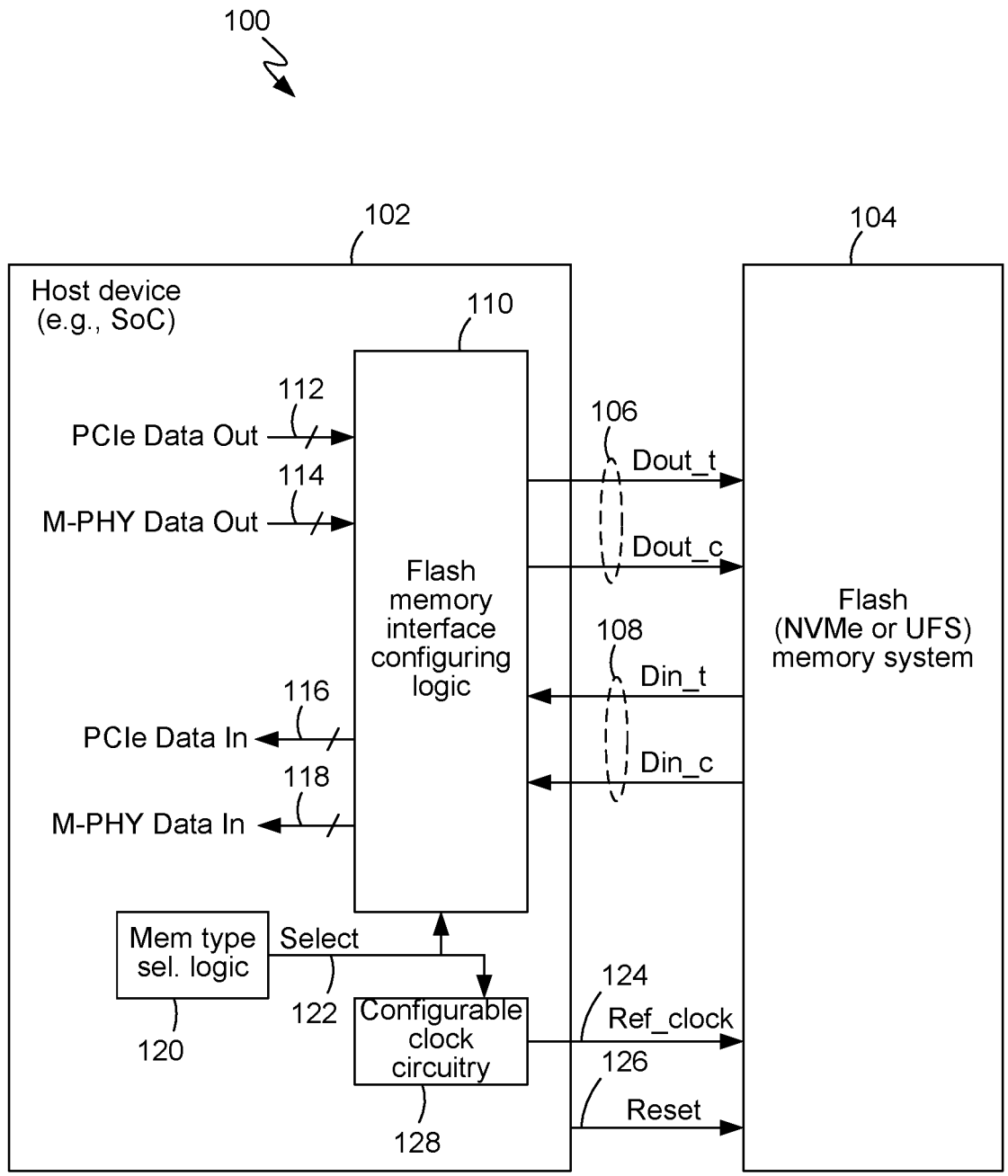
FIG. 1 is a block diagram of a system for selectably configuring a flash memory physical interface, in accordance with exemplary embodiments.

As shown in FIG. 1, in an illustrative or exemplary embodiment a system 100 may include a host device 102 and a flash memory device or system 104. The host device 102 may be, for example, a system-on-a-chip ("SoC"). The flash memory system 104 may be coupled to the SoC. Although not shown for purposes of clarity in FIG. 1, the host device 102 and flash memory system 104 may be included in a computing device, such as a mobile computing device. In exemplary embodiments, the flash memory system 104 may comprise one of two types of flash memory: Universal Flash Storage ("UFS") and Non-Volatile Memory Express ("NVMe").

The term "UFS" is used herein to refer to a family of storage access and transport protocols promulgated by JEDEC, an industry consortium. An example of one such protocol is UFS Version 4.0 (published as JESD220F UFS 4.0). As understood by one of ordinary skill in the art, UFS may use a UFS physical-layer interface known as M-PHY. The UFS Version 4.0 protocol may incorporate or reference protocols promulgated by the Mobile Industry Processor Interface ("MIPI") Alliance. UFS version 4.0, for example, references the MIPI M-PHY v5.0 physical layer specification and the MIPI UNIPRO v2.0 transport layer specification.

The term "NVMe" is used herein to refer to a family of storage access and transport protocols for flash memory and solid-state storage drives, promulgated by the NVMe Work Group, an industry consortium. As understood by one of ordinary skill in the art, the NVMe protocol accesses flash storage via a Peripheral Component Interconnect Express ("PCIe") bus. The host device 102 may include UFS, M-PHY, NVMe, PCIe, etc., features relating to communication between the host device 102 and the flash memory system 104. As such features are well understood by one of ordinary skill in the art, they are not described herein.

Regardless of whether the flash memory system 104 is UFS or NVMe, the signal paths of the physical interface coupling the flash memory system 104 to the host device 102 may comprise a differential data output signal path 106 configured to carry true and complement output data signals Dout_t and Dout_c, respectively, and a differential data input signal path 108 configured to carry true and complement input data signals Din_t and Din_c, respectively. The host device 102 may send data to a differential data input of the flash memory system 104 on the differential data output signal path 106 and receive data from a differential data signal output of the flash memory system 104 on the differential data input signal path 108.

The host device 102 may include flash memory interface configuring logic 110. The flash memory interface configuring logic 110 may have a first data input configured to receive a PCIe data output signal 112 ("PCIe Data Out") and a second data input configured to receive an M-PHY data output signal 114 ("M-PHY Data Out"). The configuring logic 110 may also have a first data output configured to provide a PCIe data input signal 116 (also referred to as "PCIe Data In") and a second data output configured to provide an M-PHY data input signal 118 ("M-PHY Data In"). The PCIe Data Out signal and the M-PHY Data Out signal are configured to provide data that the host device 102 is sending to the flash memory 104 (i.e., out of the host device 102). The PCIe Data In signal path and the M-PHY Data In signal path are configured to receive data from the flash memory 104 (i.e., into the host device 102). Although the term "data" is used herein for convenience, it should be understood that the "data" communicated between the host device 102 and the flash memory system 104 may include any type of information.

The host device 102 may also include memory type selecting logic 120. The memory type selecting logic 120 may be configured to provide a selection signal 122 ("Select") to the flash memory interface configuring logic 110. The selection signal 122 may indicate whether the flash memory 104 is UFS or NVMe. The memory type selecting logic 120 may have any of various structures (not shown for purposes of clarity). In one example, the memory type selecting logic 120 may include an SoC pin hard-wired to a voltage, where a first voltage level (e.g., ground) may indicate UFS and a second voltage level (e.g., a positive voltage) may indicate NVMe. In another example, the memory type selecting logic 120 may include an impedance, where a first impedance level may indicate UFS and a second impedance level may indicate NVMe. In still another example, the memory type selecting logic 120 may include a fusible link (fuse or eFuse), where the fuse state (i.e., either intact or blown) may indicate either UFS or NVMe. In yet another example, the memory type selecting logic 120 may include a register that may be loaded by a processor with a bit value indicating either UFS or NVMe. The memory type selecting logic 120 may include a detector circuit to detect the voltage, impedance, fuse state, bit value, etc., and produce the selection signal 122 based on the detection result.

The signal paths of the physical interface coupling the flash memory system 104 to the host device 102 may also include a reference clock signal path 124 and a reset signal path 126. The flash memory 104 may utilize a reference clock signal received on the reference clock signal path 124. The flash memory 104 may utilize a reset signal received on the reset signal path 126. The host device 102 may include configurable clock circuitry 128. The configurable clock circuitry 128 may be configurable based on the selection signal 122.

Figure 2:
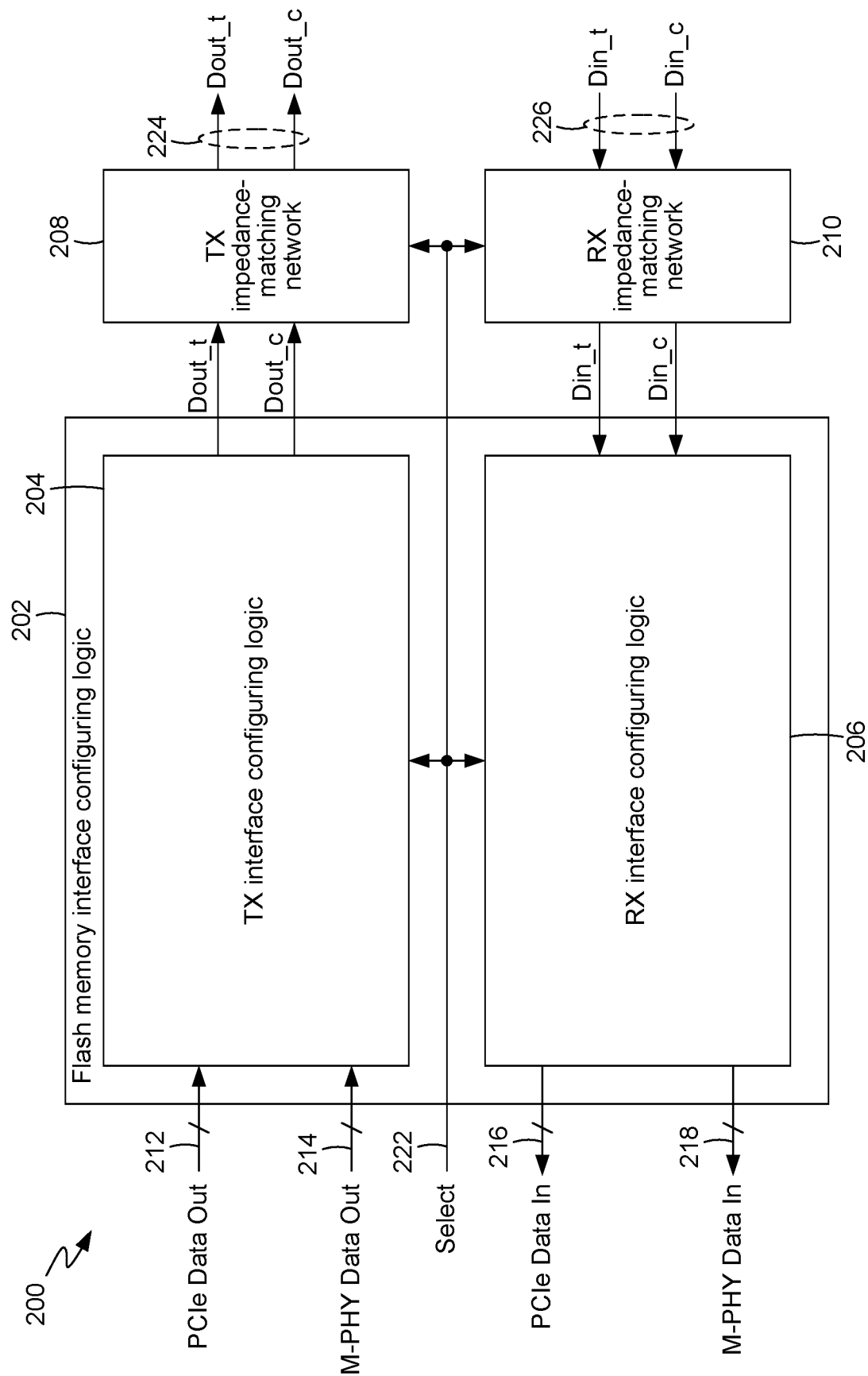
FIG. 2 is a block diagram of flash memory physical interface configuring logic and configurable impedance-matching networks, in accordance with exemplary embodiments.

As shown in FIG. 2, a system 200 may include flash memory interface configuring logic 202. The flash memory interface configuring logic 202 may be an example of the above-described flash memory interface configuring logic 102 (FIG. 1). The flash memory interface configuring logic 202 may include transmit ("TX") interface configuring logic 204 and receive ("RX") interface configuring logic 206.

The TX interface configuring logic 204 may have a first data input configured to receive a PCIe data output signal 212 ("PCIe Data Out") and a second data input configured to receive an M-PHY data output signal 214 ("M-PHY Data Out"). The RX interface configuring logic 206 may have a first data output configured to provide a PCIe data input signal 216 ("PCIe Data In") and a second data output configured to provide an M-PHY data input signal 218 ("M-PHY Data In"). The TX interface configuring logic 204 and RX interface configuring logic 206 each may receive the selection signal 222.

The data output of the TX interface configuring logic 204 may be coupled to a TX impedance-matching network 208. The impedance coupled by the TX impedance-matching network 208 may be controlled or selected based on the selection signal 222. Similarly, the data input of the RX interface configuring logic 206 may be coupled to an RX impedance-matching network 210. The impedance coupled by the RX impedance-matching network 210 may be controlled or selected based on the selection signal 222. The TX impedance-matching network 208 may thus couple a configurable or selectable impedance to the differential data output signal path 224 between the flash memory interface configuring logic 202 and the flash memory (not shown in FIG. 2). Similarly, the RX impedance-matching network 210 may couple a configurable or selectable impedance to the differential data input signal path 226 between the flash memory interface configuring logic 202 and the flash memory (not shown in FIG. 2).

Figure 3:
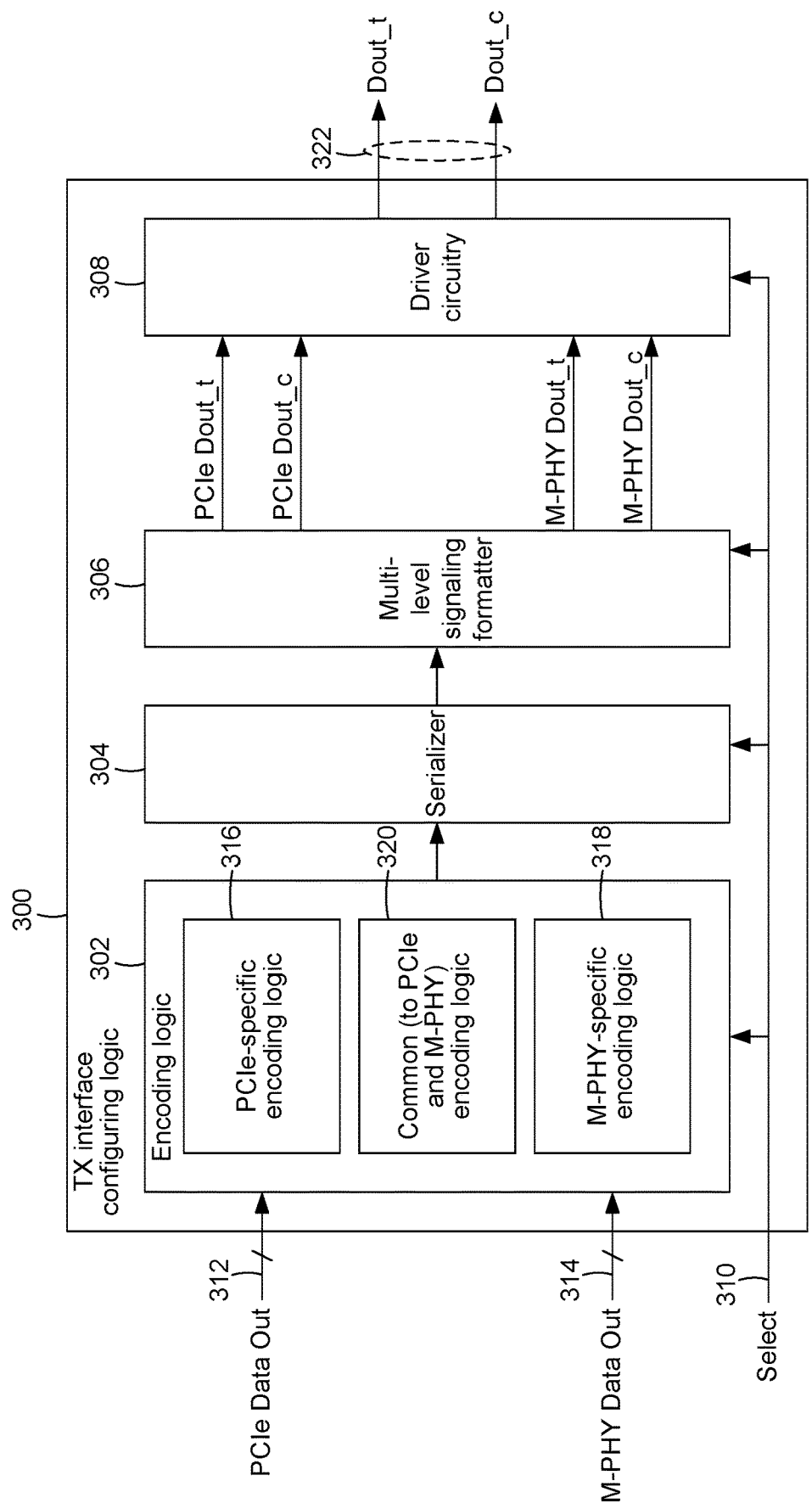
FIG. 3 is a block diagram of a transmit or TX portion of the flash memory physical interface configuring logic, in accordance with exemplary embodiments.

In FIG. 3, TX interface configuring logic 300 is shown. The TX interface configuring logic 300 may be an example of the above-described TX interface configuring logic 204 (FIG. 2). The TX interface configuring logic 300 may include encoding logic 302, a serializer 304, a multi-level signaling formatter 306, and driver circuitry 308, each of which may have a selector input configured to receive the selection signal 310.

The encoding logic 302 may be configured to receive the PCIe data output signal 312 and the M-PHY data output signal 314. For example, the PCIe data output signal 312 and the M-PHY data output signal 314 may be received from a processing unit (not shown). Such a processing unit may comprise a processor, such as a central processing unit ("CPU"), application processor ("AP"), graphics processing unit ("GPU"), or other processor that may initiate or control memory transactions. Such a processor may be configured to provide PCIe data (i.e., the PCIe data output signal 312) to the encoding logic 302 via a PCIe bus and similarly provide M-PHY data (i.e., the M-PHY data output signal 314) via a bus. Alternatively, such a processing unit may be an intermediary component (not shown), e.g., a peripheral interface block, which receives data from a processor via a bus or other data interconnect. Such a peripheral block may comprise a processor, a finite state machine, or specific hardware, etc. The peripheral block may format data received from a processor into PCIe or M-PHY formats. The peripheral block may be configured to provide PCIe data to the encoding logic 302 via a PCIe bus and similarly provide M-PHY data via a bus.

The encoding logic 302 may include PCIe-specific encoding logic 316, M-PHY-specific encoding logic 318, and common (to both PCIe and M-PHY) encoding logic 320. The encoding logic 302 encodes the PCIe output data and M-PHY output data in accordance with the PCIe and M-PHY protocols, respectively. As such encoding logic 316-320 is well understood by one of ordinary skill in the art, these elements are not described in further detail herein.

The encoding logic 302 may provide encoded output data to the serializer 304, which may convert the encoded output data from a parallel format to a serial format. The serializer 304 may provide the resulting serial-format data to the multi-level signaling formatter 306. The multi-level signaling formatter 306 may convert its input signal from the serial format to a pulse-width modulation ("PWM"), a pulse-amplitude modulation ("PAM") such as PAM-3, PAM-4, etc., or any combination thereof. The multi-level signaling formatter 306 may provide a PCIe differential data output signal (comprising true and complement signals PCIe Dout_t and PCIe Dout_c, respectively) and an M-PHY differential data output signal (comprising true and complement signals M-PHY Dout_t and M-PHY Dout_c, respectively) to the driver circuitry 308. As described below, the driver circuitry 308 may provide a differential data output signal 322 selected from either the PCIe differential memory data signal or the M-PHY differential memory data signal based on the selection signal 310.

Figure 4:
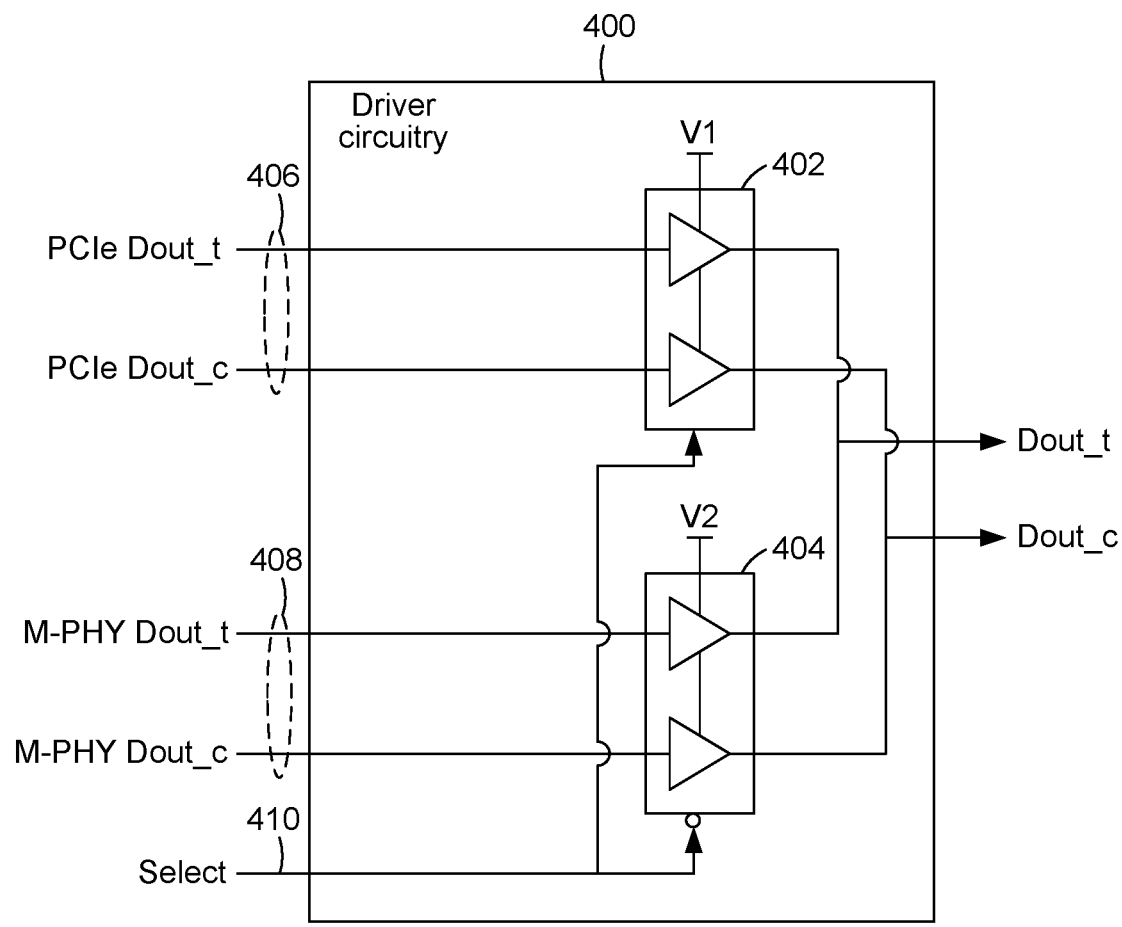
FIG. 4 is a block diagram of an example of driver circuitry, in accordance with exemplary embodiments.

In FIG. 4, driver circuitry 400 is shown. The driver circuitry 400 may be an example of the above-described driver circuitry 308 (FIG. 3). The driver circuitry 400 may include a first tri-state differential driver 402 and a second tri-state differential driver 404. The first tri-state differential driver 402 may receive the PCIe differential data output signal 406, and the second tri-state differential driver 404 may receive the M-PHY differential data output signal 408. The outputs of the first tri-state differential driver 402 and the second tri-state differential driver 404 are coupled together to provide the differential data output comprising the Dout_t and Dout_c signals. The first tri-state differential driver 402 and the second tri-state differential driver 404 may operate in a complementary manner with respect to each other in response to the selection signal 410. That is, when the selection signal 410 indicates that the memory is NVMe (i.e., the physical interface protocol is PCIe), the second tri-state differential driver 404 drives its output to high impedance, while the first tri-state differential driver 402 drives its output to provide the PCIe differential data output signal. Conversely, when the selection signal 410 indicates that the memory is UFS (i.e., the physical interface protocol is M-PHY), the first tri-state differential driver 402 drives its output to high impedance, while the second tri-state differential driver 404 drives its output to provide the M-PHY differential data output signal.

The drivers 402 and 404 may drive the respective signals using respective voltage levels. A first voltage level ("V1") may be provided to the first driver 402, and a second voltage level ("V2") may be provided to the second driver 404. Accordingly, when the physical interface protocol is PCIe, the driver 402 drives the differential data output (comprising the Dout_t and Dout_c signals) at the first voltage level, and when the physical interface protocol is M-PHY, the driver 404 drives the differential data output at the second voltage level.

Figure 5:
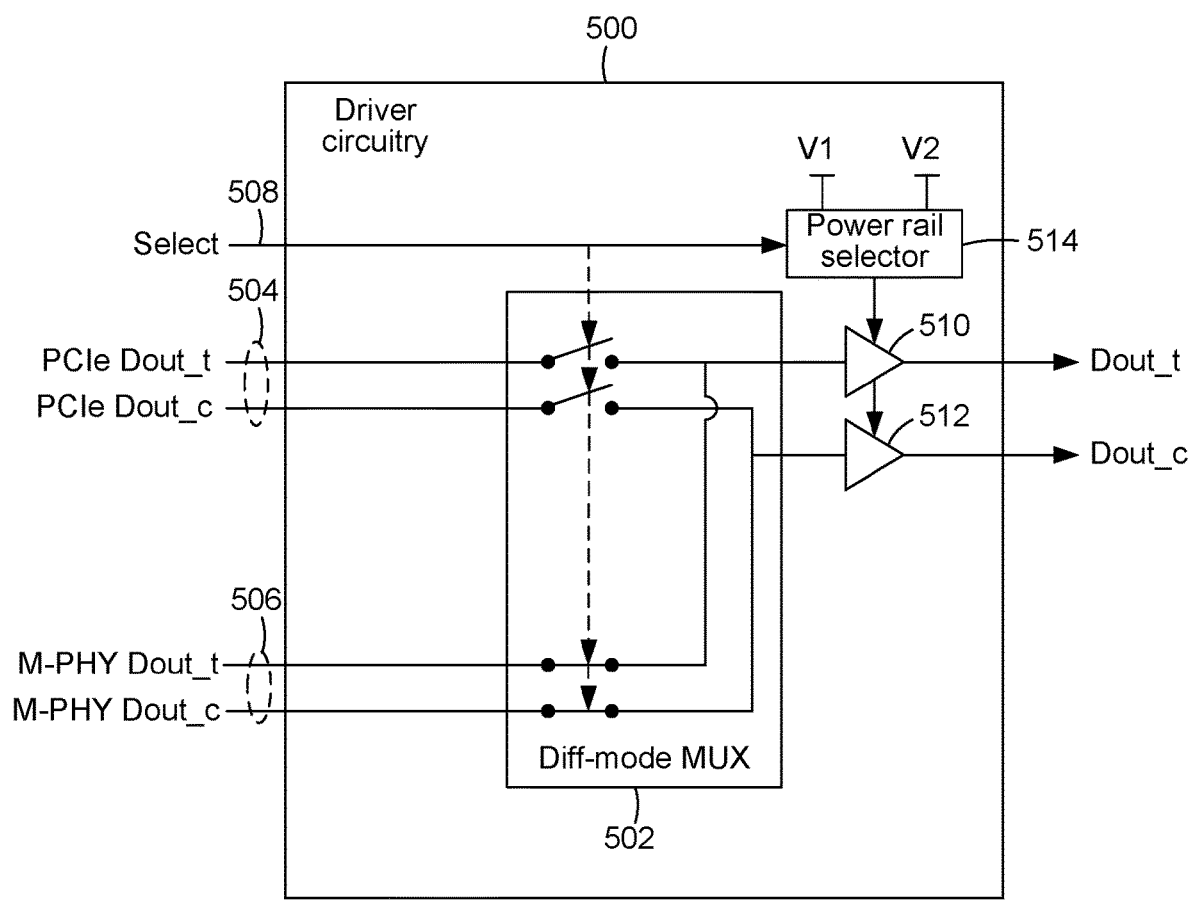
FIG. 5 is a block diagram of another example of driver circuitry, in accordance with exemplary embodiments.

In FIG. 5, driver circuitry 500 is shown. Driver circuitry 500 may be another example of the above-described driver circuitry 308 (FIG. 3). Driver circuitry 500 and the above-described driver circuitry 400 (FIG. 4) may be alternatives to each other. Driver circuitry 500 may include a differential-mode signal multiplexer ("MUX") 502 configured to select either the PCIe differential data output signal 504 or the M-PHY differential data output signal 506 in response to the selection signal 508. A pair of drivers 510 and 512 may receive the output of the differential-mode signal MUX 502 and provide the differential data output comprising the Dout_t and Dout_c signals.

The drivers 510 and 512 may drive the respective signals using a voltage level provided by a power rail selector 514. The power rail selector 514 may provide either a first voltage level ("V1") or a second voltage level ("V2") in response to the selection signal 508. For example, when the selection signal 508 indicates that the memory is NVMe (i.e., the physical interface protocol is PCIe), the power rail selector 514 may provide the first voltage level, and when the selection signal 508 indicates that the memory is UFS (i.e., the physical interface protocol is M-PHY), the power rail selector 514 may provide the second voltage level.

Figure 6:
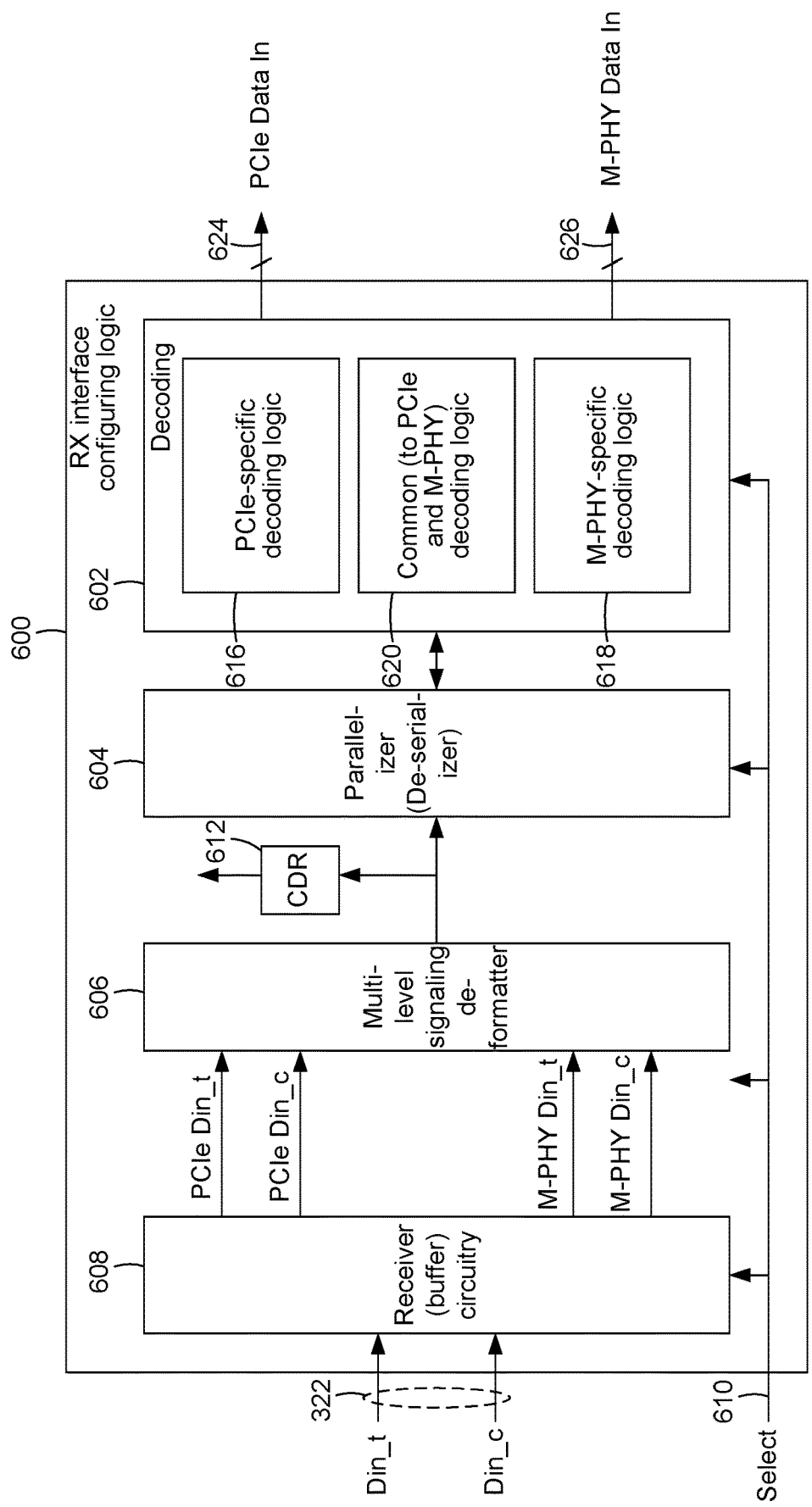
FIG. 6 is a block diagram of a receive or RX portion of the flash memory physical interface configuring logic, in accordance with exemplary embodiments.

In FIG. 6, RX interface configuring logic 600 is shown. The RX interface configuring logic 600 may be an example of the above-described RX interface configuring logic 206 (FIG. 2). The RX interface configuring logic 600 may include buffer circuitry (also referred to as receiver circuitry) 608, a multi-level signaling de-formatter 606, a parallelizer or de-serializer 604, and decoding logic 602, each of which may have a selector input configured to receive the selection signal 610.

The receiver or buffer circuitry 608 may receive a differential data output signal 622, which may be either a PCIe differential data output signal or an M-PHY differential data output signal. The buffer circuitry 608 provides the PCIe differential data output signal or the M-PHY differential data output signal to the multi-level signaling de-formatter 606.

The multi-level signaling de-formatter 606 may convert its input signal from PWM, PAM, etc., to a serial format. The output of the multi-level signaling de-formatter 606 may be provided to the de-serializer 604, which may convert the data from a serial format to a parallel format. The de-serializer 604 may provide the resulting parallel-format data to the decoding logic 602. In some examples, the output of the multi-level signaling de-formatter 606 may also be provided to clock-data recovery ("CDR") logic 612. The CDR logic 612 may recover a clock signal from the data signal. The host device may use the recovered clock signal to further process the data.

The decoding logic 602 may be configured to decode the data, which may be either PCIe data or M-PHY data. The decoding logic 602 may include PCIe-specific decoding logic 616, M-PHY-specific decoding logic 618, and common (to both PCIe and M-PHY) decoding logic 620. The decoding logic 602 decodes the PCIe data and M-PHY data in accordance with the PCIe and M-PHY protocols, respectively. As such decoding logic 616-620 is well understood by one of ordinary skill in the art, these elements are not described in further detail herein. The outputs of the decoding logic 602 may include a PCIe data input signal 624 ("PCIe Data In") and an M-PHY data input signal 626 ("M-PHY Data In").

The decoding logic 602 may provide the PCIe data input signal 624 and the M-PHY data input signal 626 to a processing unit (not shown) of the type described above with regard to FIG. 3. The processing unit to which the decoding logic 602 provides the PCIe data input signal 624 may be the same processing unit from which the encoding logic 302 (FIG. 3) receives the PCIe data output signal 312 or it may be a different processing unit. The processing unit to which the decoding logic 602 provides the M-PHY data input signal 626 may be the same processing unit from which the encoding logic 302 receives the M-PHY data output signal 314 or it may be a different processing unit. PCIe data may be provided to the processing unit via a PCIe bus, and M-PHY data similarly may be provided via a bus.

Figure 7:
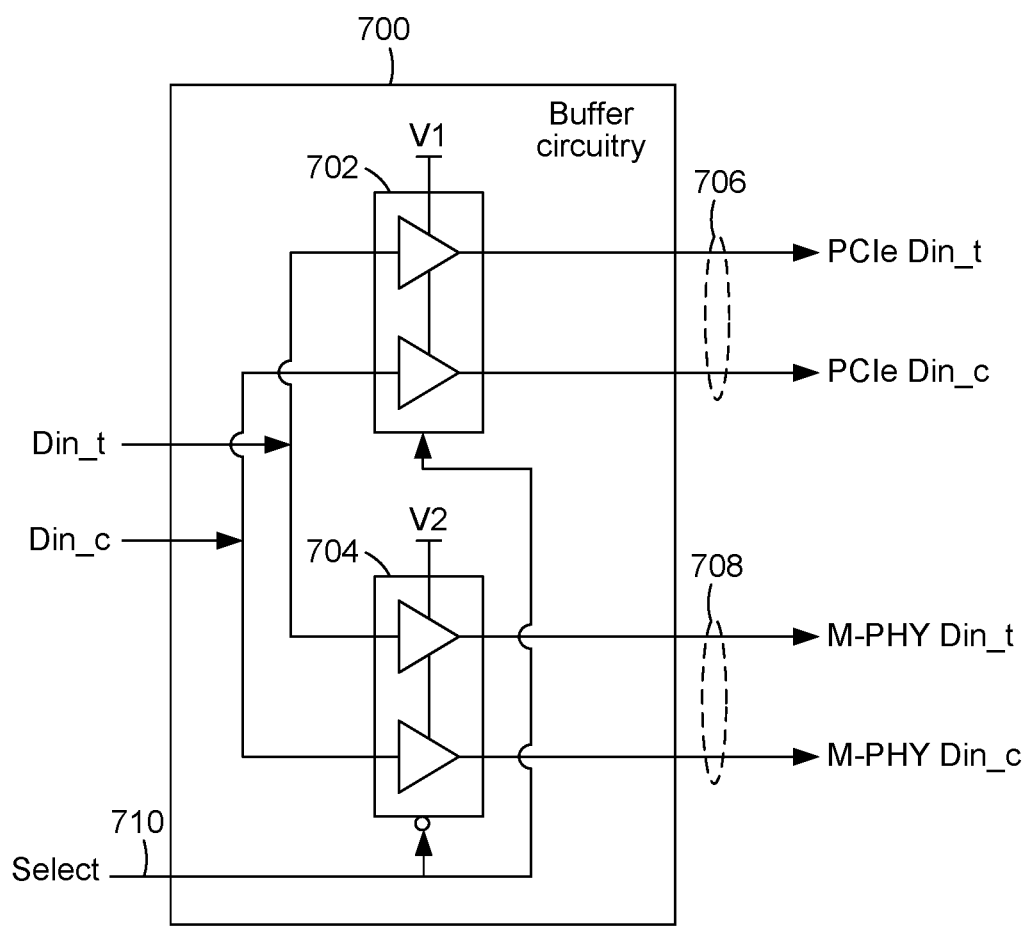
FIG. 7 is a block diagram of an example of receiver or buffer circuitry, in accordance with exemplary embodiments.

In FIG. 7, receiver or buffer circuitry 700 is shown. The buffer circuitry 700 may be an example of the above-described buffer circuitry 608 (FIG. 6). The buffer circuitry 700 may include a first differential-mode buffer 702 and a second differential-mode buffer 704. The buffers 702 and 704 may be tri-state buffers. The first buffer 702 and second buffer 704 each receive may receive the differential data input comprising the Din_t and Din_c signals. The buffers 702 and 704 may drive the respective signals using respective voltage levels. A first voltage level ("V1") may be provided to the first buffer 702, and a second voltage level ("V2") may be provided to the second buffer 704. Accordingly, when the physical interface protocol is PCIe, the first buffer 702 may drive the PCIe differential data input signal 706 at the first voltage level, and when the physical interface protocol is M-PHY, the second buffer 704 may drive the M-PHY differential data input signal 708 at the second voltage level.

In an example in which the buffers 702 and 704 are tri-state buffers, the buffers 702 and 704 may operate in a complementary manner with respect to each other in response to the selection signal 710. That is, when the selection signal 710 indicates that the memory is NVMe (i.e., the physical interface protocol is PCIe), the second buffer 704 sets its output to high impedance, while the first buffer 702 drives its output to provide the PCIe differential data input signal. Conversely, when the selection signal 710 indicates that the memory is UFS (i.e., the physical interface protocol is M-PHY), the first buffer 702 sets its output to high impedance, while the second buffer 704 drives its output to provide the M-PHY differential data input signal.

Figure 8:
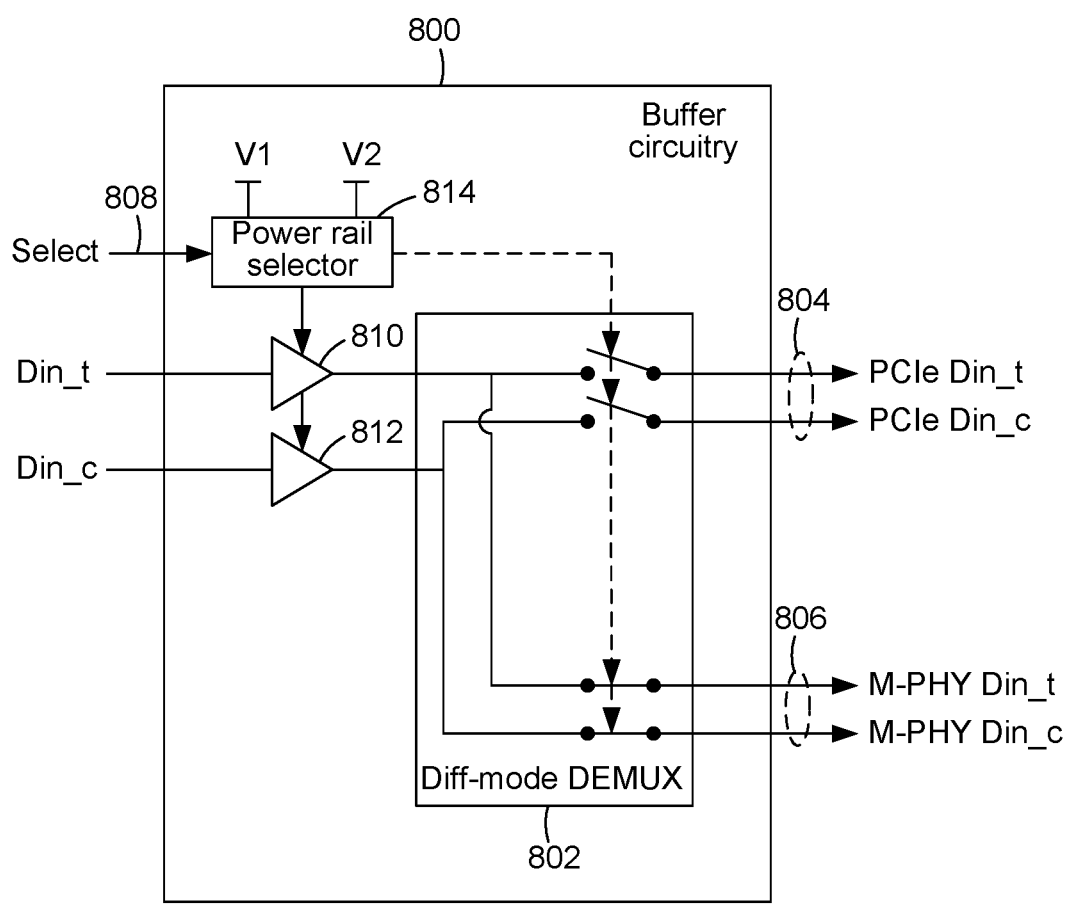
FIG. 8 is a block diagram of another example of receiver or buffer circuitry, in accordance with exemplary embodiments.

In FIG. 8, receiver or buffer circuitry 800 is shown. Buffer circuitry 800 may be another example of the above-described buffer circuitry 608 (FIG. 6). Buffer circuitry 800 and the above-described driver circuitry 700 (FIG. 7) may be alternatives to each other. Buffer circuitry 800 may include a differential-mode signal de-multiplexer ("DEMUX") 802 configured to provide the PCIe differential data output signal 804 or the M-PHY differential data output signal 806 in response to the selection signal 808.

A pair of buffers 810 and 812 may receive the differential data input comprising the Din_t and Din_c signals. The buffers 810 and 812 may receive (e.g., by setting a signal detection threshold level for) the respective signals using a reference voltage level provided by a power rail selector 814. The power rail selector 814 may provide either a first reference voltage level ("V1") or a second reference voltage level ("V2") in response to the selection signal 808. For example, when the selection signal 808 indicates that the memory is NVMe (i.e., the physical interface protocol is PCIe), the power rail selector 814 may provide the first reference voltage level, and when the selection signal 808 indicates that the memory is UFS (i.e., the physical interface protocol is M-PHY), the power rail selector 814 may provide the second reference voltage level. In receiving data, the buffers 810 and 812 may compare the differential data input comprising the Din_t and Din_c signals with the selected reference voltage level.

Figure 9:
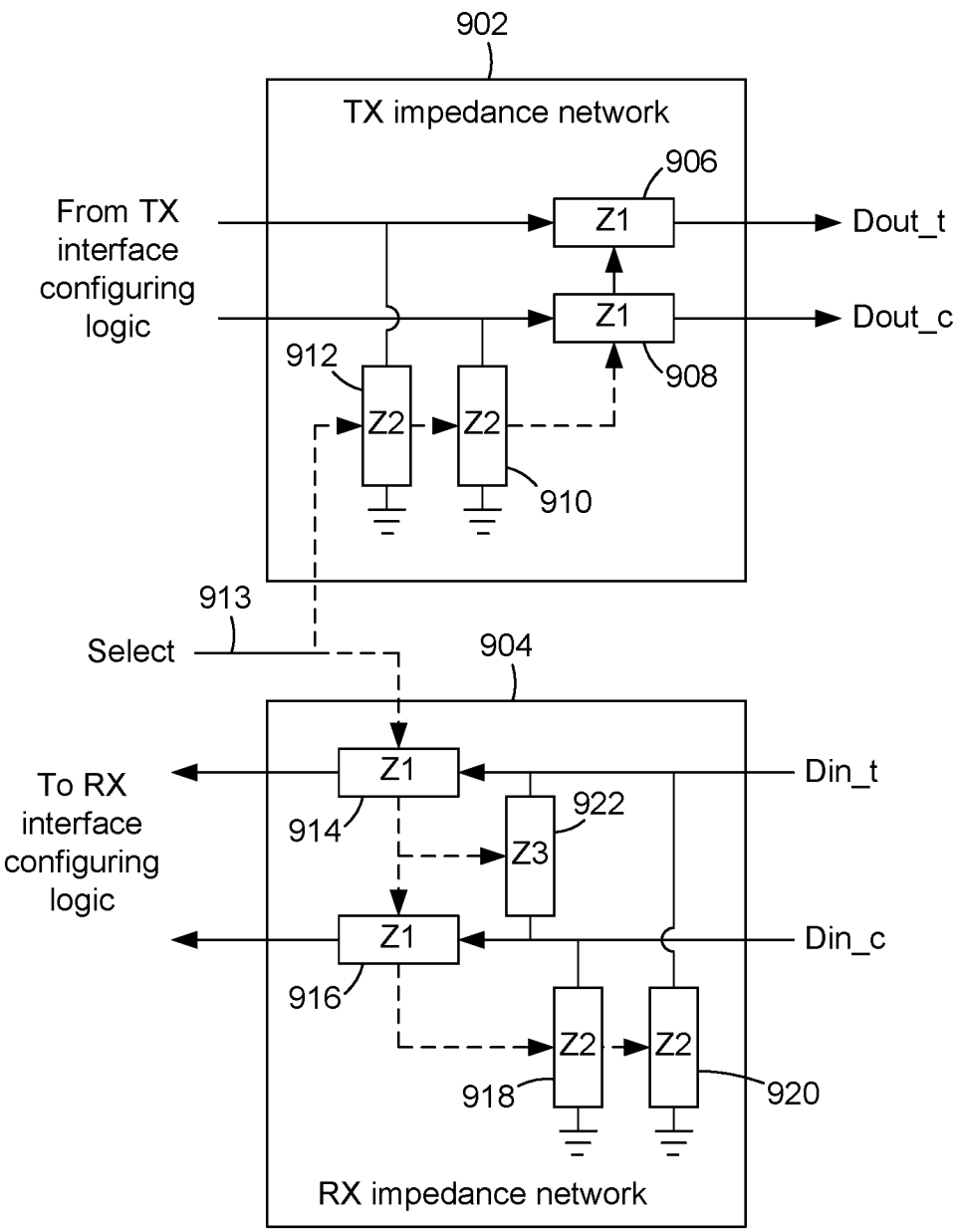
FIG. 9 is a block diagram of configurable TX and RX impedance networks, in accordance with exemplary embodiments.

In FIG. 9, a TX impedance network 902 and an RX impedance network 904 are shown. The TX impedance network 902 and the RX impedance network 904 may be examples of the above-described TX impedance-matching network 208 and RX impedance-matching network 210 (FIG. 2).

The TX impedance network 902 may include a first impedance 906, a second impedance 908, a third impedance 910, and a fourth impedance 912. The RX impedance network 904 may include a fifth impedance 914, a sixth impedance 916, a seventh impedance 918, an eighth impedance 920, and a ninth impedance 922.

The first impedance 906 may be in the Dout_t signal path between the input and output sides of the TX impedance network 902. The second impedance 908 may be in the Dout_c signal path between the input and output sides of the TX impedance network 902. The third impedance 910 may be in the Dout_c signal path between the input side of the TX impedance network 902 and ground. The fourth impedance 912 may be in the Dout_t signal path between the input side of the TX impedance network 902 and ground. The first impedance 906 and the second impedance 908 may have the same impedance value, Z1. The third impedance 910 and the fourth impedance 912 may have the same impedance value, Z2. Each of the first impedance 906, the second impedance 908, the third impedance 910, and the fourth impedance 912 may have a control input configured to receive the selection signal 913. Each of the first impedance 906, the second impedance 908, the third impedance 910, and the fourth impedance 912 may change the values of Z1 and Z2 in response to the selection signal 913. For example, the combination of the first impedance 906, the second impedance 908, the third impedance 910, and the fourth impedance 912 may assume a first impedance configuration in response to the selection signal 913 indicating the PCIe physical interface type, and may assume a second impedance configuration in response to the selection signal 913 indicating the M-PHY physical interface type.

The fifth impedance 914 may be in the Dint signal path between the input and output sides of the RX impedance network 904. The sixth impedance 916 may be in the Din_c signal path between the input and output sides of the RX impedance network 904. The seventh impedance 918 may be in the Din_c signal path between the input side of the RX impedance network 904 and ground. The eighth impedance 920 may be in the Din_t signal path between the input side of the RX impedance network 904 and ground. The ninth impedance 922 may be across the Din_t and Din_c signal paths on the input side of the input impedance network 902. The fifth impedance 914 and the sixth impedance 916 may have the impedance value Z1. The seventh impedance 918 and the eighth impedance 92 may have the impedance value Z2. The ninth impedance 922 may have yet another impedance value, Z3. Each of the fifth impedance 914, the sixth impedance 916, the seventh impedance 918, the eighth impedance 920, and the ninth impedance 922 may have a control input configured to receive the selection signal 913. Each of the fifth impedance 914, the sixth impedance 916, the seventh impedance 918, the eighth impedance 920, and the ninth impedance 922 may change the values of Z1, Z2 and Z3 in response to the selection signal 913. For example, the combination of the fifth impedance 914, the sixth impedance 916, the seventh impedance 918, the eighth impedance 920, and the ninth impedance 922 may assume a third impedance configuration in response to the selection signal 913 indicating the PCIe physical interface type, and may assume a fourth impedance configuration in response to the selection signal 913 indicating the M-PHY physical interface type.

Figure 10:
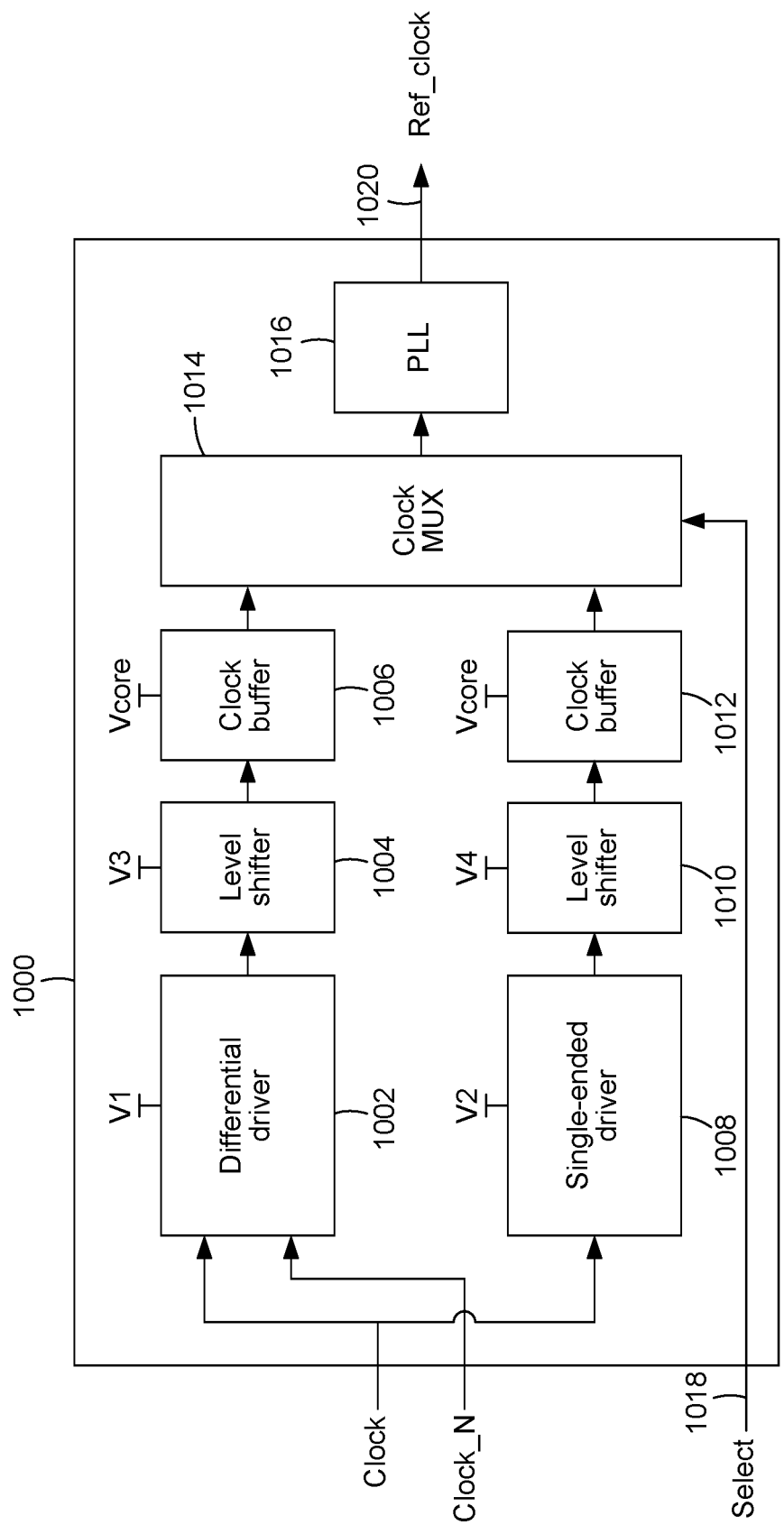
FIG. 10 is a block diagram of configurable clock circuitry in accordance with exemplary embodiments.

In FIG. 10, configurable clock circuitry 1000 is shown. The configurable clock circuitry 1000 may be an example of the above-described configurable clock circuitry 128 (FIG. 1). The configurable clock circuitry 1000 may include a differential driver 1002, a first level shifter 1004, a first clock buffer 1006, a single-ended driver 1008, a second level shifter 1010, a second clock buffer 1012, a clock MUX 1014, and a phase-locked loop ("PLL") 1016. The differential-mode driver 1002 may receive a differential-mode clock signal ("Clock" and its complement "Clock_N"). The single-ended driver 1008 may receive the Clock signal. The output of the differential driver 1002 may be provided to an input of the first level shifter 1004. The output of the first level shifter 1004 may be provided to an input of the first clock buffer 1006. The output of the first clock buffer 1006 may be provided to a first input of the clock MUX 1014. The output of the single-ended driver 1008 may be provided to an input of the second level shifter 1010. The output of the second level shifter 1010 may be provided to an input of the second clock buffer 1012. The output of the second clock buffer 1012 may be provided to a second input of the clock MUX 1014. The clock MUX 1014 may have a selector input configured to receive the selection signal 1018. In response to the selection signal 1018, the clock MUX 1014 may select as its output either the differential clock signal (as processed by the differential driver 1002, the first level shifter 1004, and the first clock buffer 1006) or the single-ended clock signal (as processed by the single-ended driver 1008, the second level shifter 1010, and the second clock buffer 1012). The output of the clock MUX 1014 (i.e., the selected clock signal) may be provided to the PLL 1016. The output of the PLL 1016 may serve as a reference clock signal 1020 as described above with regard to the reference clock signal 124 (FIG. 1).

Figure 11:
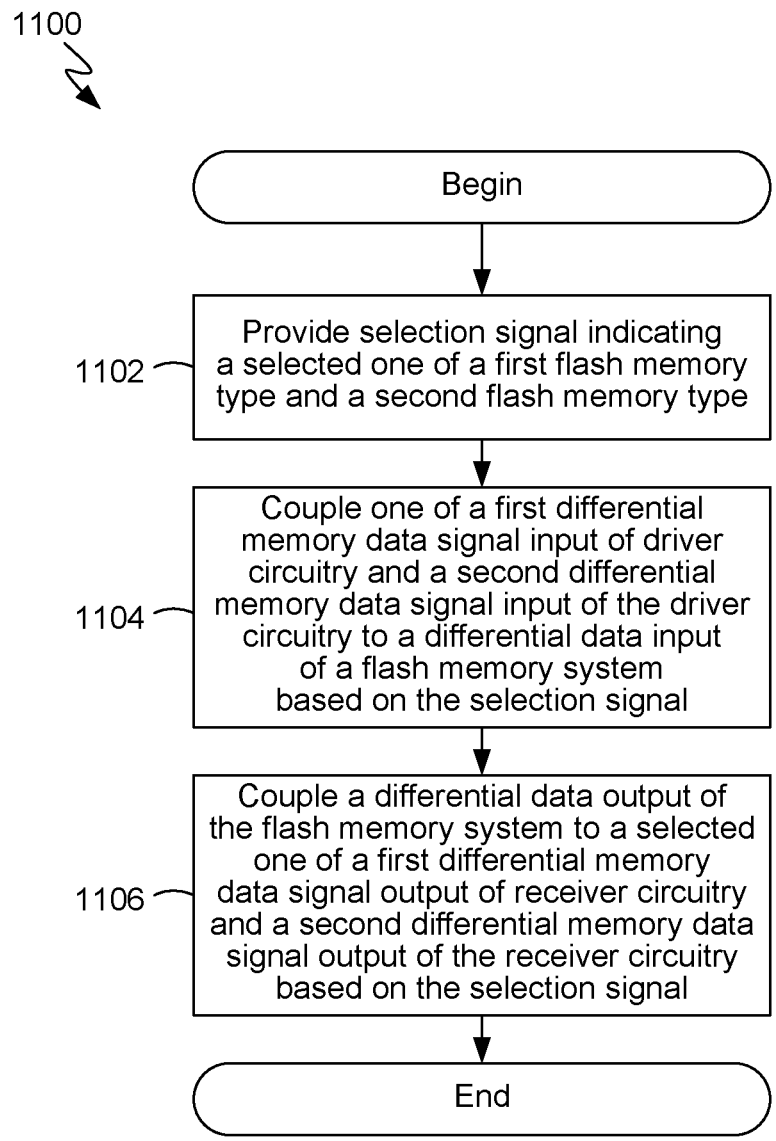
FIG. 11 is a flow diagram illustrating a method for selectably configuring a flash memory physical interface, in accordance with exemplary embodiments.

In FIG. 11 a method 1100 for selectably configuring a flash memory physical interface is illustrated in block diagram form. As indicated by block 1102, the method 1100 may include providing a selection signal indicating a selected one of a first flash memory type and a second flash memory type. As indicated by block 1104, the method 1100 may also include coupling, by driver circuitry, one of a first differential memory data signal input of the driver circuitry and a second differential memory data signal input of the driver circuitry to a differential data input of a flash memory system based on the selection signal. As indicated by block 1106, the method 1100 may further include coupling, by receiver circuitry, a differential data output of the flash memory system to a selected one of a first differential memory data signal output of the receiver circuitry and a second differential memory data signal output of the receiver circuitry based on the selection signal.

Figure 12:
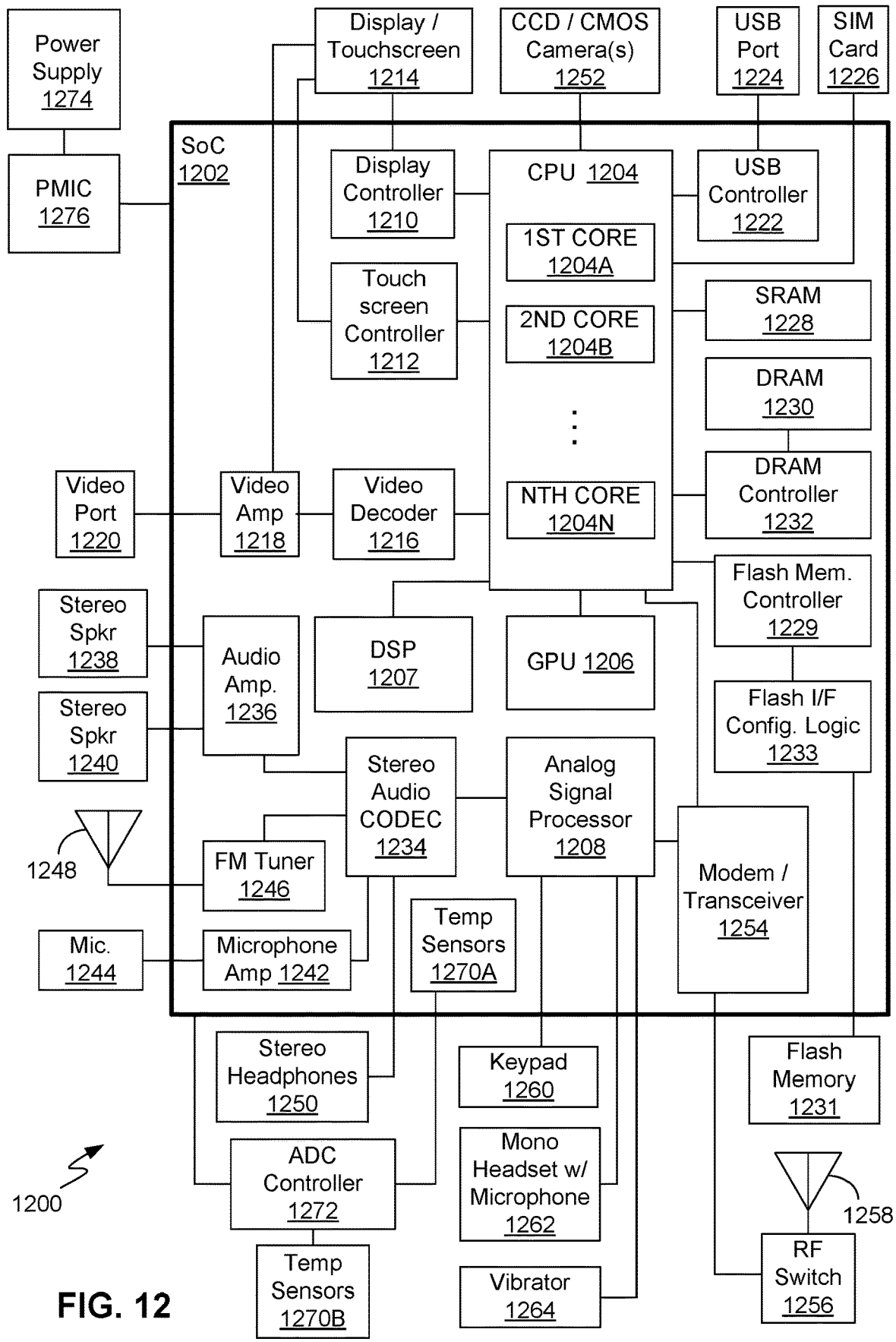
FIG. 12 is block diagram of a portable computing device, in accordance with exemplary embodiments.

FIG. 12 illustrates an example of a portable computing device ("PCD") 1200, in which exemplary embodiments of systems, methods, computer-readable media, and other examples of selectably configuring a flash memory physical interface may be provided. The PCD 1200 may be, for example, a laptop or palmtop computer, cellular telephone or smartphone, personal digital assistant, navigation device, smartbook, portable game console, satellite telephone, etc. For purposes of clarity, some data buses, interconnects, signals, etc., are not shown in FIG. 12. For example, a PCIe bus is not shown but may be included and configured to interconnect various processing systems, memories, etc., as understood by one of ordinary skill in the art.

The PCD 1200 may include an SoC 1202. The SoC 1202 may include a CPU 1204, a GPU 1206, a digital signal processor ("DSP") 1207, an analog signal processor 1208, a modem/modem subsystem 1254, or other processors. The CPU 1204 may include one or more CPU cores, such as a first CPU core 1204A, a second CPU core 1204B, etc., through an Nth CPU core 1204N.

A display controller 1210 and a touch-screen controller 1212 may be coupled to the CPU 1204. A touchscreen display 1214 external to the SoC 1202 may be coupled to the display controller 1210 and the touch-screen controller 1212. The PCD 1200 may further include a video decoder 1216 coupled to the CPU 1204. A video amplifier 1218 may be coupled to the video decoder 1216 and the touchscreen display 1214. A video port 1220 may be coupled to the video amplifier 1218. A universal serial bus ("USB") controller 1222 may also be coupled to CPU 1204, and a USB port 1224 may be coupled to the USB controller 1222. A subscriber identity module ("SIM") card 1226 may also be coupled to the CPU 1204.

The CPU 1204 may be coupled to one or more memories, with which the CPU 1204 may initiate memory transactions. The one or more memories may include both volatile and non-volatile memories or NVMs. Examples of volatile memories include static random access memory ("SRAM") 1228 and dynamic random access memory ("DRAM") 1230. Such memories may be internal to the SoC 1202, as in the illustrated embodiment, or alternatively, may be external to the SoC 1202. A DRAM controller 1229 coupled to the CPU 1204 may control the writing of data to, and reading of data from, the DRAM 1230.

The one or more memories may also include a flash memory 1231. The flash memory 1231 may be NVMe or UFS. A flash memory controller 1229 coupled to the CPU 1204 may control aspects of writing of data to, and reading of data from, the flash memory 1231. In an example in which the flash memory 1231 is NVMe, some or all NVMe controller functionality may be included within the flash memory 1231, and the flash memory 1231 may be coupled to the CPU 1204 via a PCIe bus (not shown).

Flash memory interface configuring logic 1233 may be coupled in a path between the flash memory controller 1229 and the flash memory 1231. The flash memory interface configuring logic 1233 may be an example of the above-described flash memory interface configuring logic 110 (FIG. 1) or 202 (FIG. 2). Although not shown in FIG. 12 for purposes of clarity, the flash memory interface configuring logic 1233 may be coupled to a source of the above-described selection signal that indicates whether the flash memory 1231 is NMVe or UFS.

A stereo audio CODEC 1234 may be coupled to the analog signal processor 1208. Further, an audio amplifier 1236 may be coupled to the stereo audio CODEC 1234. First and second stereo speakers 1238 and 1240, respectively, may be coupled to the audio amplifier 1236. In addition, a microphone amplifier 1242 may be coupled to the stereo audio CODEC 1234, and a microphone 1244 may be coupled to the microphone amplifier 1242. A frequency modulation ("FM") radio tuner 1246 may be coupled to the stereo audio CODEC 1234. An FM antenna 1248 may be coupled to the FM radio tuner 1246. Further, stereo headphones 1250 may be coupled to the stereo audio CODEC 1234. Other devices that may be coupled to the CPU 1204 include one or more digital (e.g., CCD or CMOS) cameras 1252.

The modem or RF transceiver 1254 may be coupled to the analog signal processor 1208 and the CPU 1204. An RF switch 1256 may be coupled to the RF transceiver 1254 and an RF antenna 1258. In addition, a keypad 1260, a mono headset with a microphone 1262, and a vibrator device 1264 may be coupled to the analog signal processor 1208.

The SoC 1202 may have one or more internal or on-chip thermal sensors 1270A and may be coupled to one or more external or off-chip thermal sensors 1270B. An analog-to-digital converter controller 1272 may convert voltage drops produced by the thermal sensors 1270A and 1270B to digital signals. A power supply 1274 and a power management integrated circuit ("PMIC") 1276 may supply power to the SoC 1202.

Firmware or software may be stored in any of the above-described memories, such as the DRAM 1230, the flash memory 1231, the SRAM 1228, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses.

1. A system for selectably configuring a flash memory physical interface, comprising:

driver circuitry having a first differential memory data signal input and a second differential memory data signal input, the driver circuitry having a driver selector input configured to receive a selection signal indicating a selected one of a first flash memory type and a second flash memory type, the driver circuitry configured to couple a selected one of the first differential memory data signal input and the second differential memory data signal input to a differential data input of a flash memory system based on the selection signal; and receiver circuitry coupled to a differential data output of the flash memory system and having a receiver selector input configured to receive the selection signal, the receiver circuitry having a first differential memory data signal output and a second differential memory data signal output, the receiver circuitry configured to couple the differential data output of the flash memory system to a selected one of the first differential memory data signal output and the second differential memory data signal output based on the selection signal.

2. The system of clause 1, wherein the driver circuitry comprises:

a first tri-state differential driver coupled to the first differential memory data signal input; and a second tri-state differential driver coupled to the second differential memory data signal input, an output of the first tri-state differential driver and an output of the second tri-state differential driver coupled together.

3. The system of clause 1, wherein the driver circuitry comprises a differential signal multiplexer.

4. The system of any of clauses 1-3, wherein the first flash memory type is Universal Flash Storage ("UFS"), and the second flash memory type is Non-Volatile Memory Express ("NVMe").

5. The system of any of clauses 1-4, further comprising:
encoding logic configured to encode output data for transmission to the flash memory system through the driver circuitry, the encoding logic comprising M-PHY encoding logic and Peripheral Component Interconnect Express ("PCIe") encoding logic, the M-PHY encoding logic configured to encode the output data using the M-PHY protocol, the PCIe encoding logic configured to encode the output data using the PCIe protocol; and
decoding logic configured to decode input data received from the flash memory system through the receiver circuitry, the decoding logic comprising M-PHY decoding logic and PCIe decoding logic, the M-PHY decoding logic configured to decode the input data using the M-PHY protocol, the PCIe decoding logic configured to decode the input data using the PCIe protocol.

6. The system of any of clause 5, further comprising:
serializer logic configured to receive parallel output data from the encoding logic and convert the parallel output data to serial output data; and
deserializer logic configured to receive serial input data from the receiver circuitry and convert the serial input data to parallel input data.

7. The system of any of clauses 1-6, further comprising:
a configurable transmit-side impedance network coupled to a differential data output of the driver circuitry and the differential data input of the flash memory system, the configurable transmit-side impedance network configured to provide a selected one of a first impedance configuration and a second impedance configuration based on the selection signal; and
a configurable receive-side impedance network coupled to a differential data input of the receiver circuitry and the differential data output of the flash memory system, the configurable receive-side impedance network configured to provide a selected one of a third impedance configuration and a fourth impedance configuration based on the selection signal.

8. The system of any of clauses 1-7, further comprising clock signal circuitry configured to select one of a first clock signal and a second clock signal based on the selection signal and to provide a selected clock signal to the flash memory system.

9. The system of any of clauses 1-8, wherein the system is included in a system-on-a-chip ("SoC"), and the SoC includes at least one processing system configured to initiate memory transactions with the flash memory system.

10. A method for selectably configuring a flash memory physical interface, comprising:
providing a selection signal indicating a selected one of a first flash memory type and a second flash memory type;
coupling, by driver circuitry, one of a first differential memory data signal input and a second differential memory data signal input to a differential data input of a flash memory system based on the selection signal; and
coupling, by receiver circuitry, a differential data output of the flash memory system to a selected one of a first differential memory data signal output and a second differential memory data signal output based on the selection signal.

11. The method of clause 10, wherein the first flash memory type is Universal Flash Storage ("UFS"), and the second flash memory type is Non-Volatile Memory Express ("NVMe").

12. The method of clause 10 or 11, further comprising:
encoding output data for transmission to the flash memory system through the driver circuitry, including encoding the output data using an M-PHY protocol and encoding the output data using a Peripheral Component Interconnect Express ("PCIe") protocol; and
decoding input data received from the flash memory system through the receiver circuitry, including decoding the input data using an M-PHY protocol and decoding the input data using the PCIe protocol.

13. The method of any of clause 12, further comprising:
converting encoded parallel output data to serial output data; and
converting serial input data from the receiver circuitry to parallel input data.

14. The method of any of clauses 10-13, further comprising:
coupling, by a configurable output impedance network, one of a first impedance configuration and a second impedance configuration to a differential data output of the driver circuitry and a differential data input of the flash memory system based on the selection signal; and
coupling, by a configurable output impedance network, one of a third impedance configuration and a fourth impedance configuration to a differential data input of the receiver circuitry and the differential data output of the flash memory system based on the selection signal.

15. The method of any of clauses 10-14, further comprising:
selecting one of a first clock signal and a second clock signal based on the selection signal; and
providing a selected clock signal to the flash memory system.

16. A system for selectably configuring a flash memory physical interface, comprising:
means for providing a selection signal indicating a selected one of a first flash memory type and a second flash memory type;
first means for coupling one of a first differential memory data signal input and a second differential memory data signal input to a differential data input of a flash memory system based on the selection signal; and
second means for coupling a differential data output of the flash memory system to a selected one of a first differential memory data signal output and a second differential memory data signal output based on the selection signal.

17. The system of clause 16, wherein the first flash memory type is Universal Flash Storage ("UFS"), and the second flash memory type is Non-Volatile Memory Express ("NVMe").

18. The system of clause 16 or 17, further comprising:
means for encoding output data for transmission to the flash memory system through the differential data output, including means for encoding the output data using an M-PHY protocol and encoding the output data using a Peripheral Component Interconnect Express ("PCIe") protocol; and
means for decoding input data received from the flash memory system through the differential data input, including means for decoding the input data using an M-PHY protocol and decoding the input data using the PCIe protocol.

19. The system of clause 18, further comprising:
means for converting encoded parallel output data to serial output data; and
means for converting serial input data from the first means for coupling to parallel input data.

20. The system of any of clauses 16-19, further comprising:
means for coupling one of a first impedance configuration and a second impedance configuration to a differential data output of the driver circuitry and a differential data input of the flash memory system based on the selection signal; and
means for coupling one of a third impedance configuration and a fourth impedance configuration to a differential data input of the second means for coupling and the differential data output of the flash memory system based on the selection signal.

21. The system of any of clauses 16-20, further comprising means for selecting one of a first clock signal and a second clock signal based on the selection signal.

22. A system-on-a-chip ("SoC"), comprising:
a processing system configured to direct memory transactions to a flash memory system;
memory type selecting logic configured to provide a selection signal indicating whether the flash memory system is a first flash memory type or a second flash memory type;
flash memory physical interface configuring logic, comprising:
driver circuitry having a first differential memory data signal input and a second differential memory data signal input, the driver circuitry having a driver selector input configured to receive the selection signal, the driver circuitry configured to couple a selected one of the first differential memory data signal input and the second differential memory data signal input to a differential data input of the flash memory system based on the selection signal; and
receiver circuitry coupled to a differential data output of a flash memory system and having a receiver selector input configured to receive the selection signal, the receiver circuitry having a first differential memory data signal output and a second differential memory data signal output, the receiver circuitry configured to couple the differential data output of the flash memory system to a selected one of the first differential memory data signal output and the second differential memory data signal output based on the selection signal.

23. The SoC of clause 22, wherein the selecting logic comprises at least one of: a register configurable by a processor; a fuse; a voltage detector responsive to a predetermined voltage level indicating flash memory type; or an impedance detector responsive to a predetermined impedance level indicating flash memory type.

24. The SoC of clause 22 or 23, wherein the driver circuitry comprises:
a first tri-state differential driver coupled to the first differential memory data signal input; and
a second tri-state differential driver coupled to the second differential memory data signal input, an output of the first tri-state differential driver and an output of the second tri-state differential driver coupled together.

25. The SoC of clause 22 or 23, wherein the driver circuitry comprises a differential signal multiplexer.

26. The SoC of any of clauses 22-25, wherein the first flash memory type is Universal Flash Storage ("UFS"), and the second flash memory type is Non-Volatile Memory Express ("NVMe").

27. The SoC of any of clauses 22-26, further comprising:
encoding logic comprising M-PHY encoding logic and Peripheral Component Interconnect Express ("PCIe") encoding logic, the M-PHY encoding logic configured to encode output data using the M-PHY protocol, the PCIe encoding logic configured to encode the output data using the PCIe protocol; and
decoding logic comprising M-PHY decoding logic and PCIe decoding logic, the M-PHY decoding logic configured to decode input data using the M-PHY protocol, the PCIe decoding logic configured to decode the input data using the PCIe protocol.

28. The SoC of clause 27, further comprising:
serializer logic configured to receive parallel output data from the encoding logic and convert the parallel output data to serial output data; and
deserializer logic configured to receive serial input data from the receiver circuitry and convert the serial input data to parallel input data.

29. The SoC of any of clauses 22-28, further comprising:
a configurable transmit-side impedance network coupled to a differential data output of the driver circuitry and the differential data input of the flash memory system, the configurable transmit-side impedance network configured to provide a selected one of a first impedance configuration and a second impedance configuration based on the selection signal; and
a configurable receive-side impedance network coupled to a differential data input of the receiver circuitry and the differential data output of the flash memory system, the configurable receive-side impedance network configured to provide a selected one of a third impedance configuration and a fourth impedance configuration based on the selection signal.

30. The SoC of any of clauses 22-29, further comprising clock signal circuitry configured to select one of a first clock signal and a second clock signal based on the selection signal and to provide a selected clock signal to the flash memory system.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A system for selectably configuring a flash memory physical interface, comprising:
memory type selection logic generating a selection signal indicating a selected one of a first flash memory type and a second flash memory type, wherein the first flash memory type comprises M-PHY flash memory, and wherein the second flash memory type comprises Peripheral Component Interconnect Express ("PCIe") flash memory;
clock circuitry coupled to the memory type selection logic, and configurable to produce first clock signals supporting the first flash memory type and second clock signals supporting the second flash memory type, the clock circuitry producing one of the first and second clock signals in response to the selection signal received from the memory type selection logic;

a flash memory system coupled to the clock circuitry, the flash memory system comprising one of the first flash memory type and the second flash memory type;

driver circuitry coupled to the memory type selection logic and having a first differential memory data signal input and a second differential memory data signal input, the driver circuitry having a driver selector input configured to receive the selection signal from the memory type selection logic indicating a selected one of the first flash memory type and the second flash memory type, the driver circuitry configured to couple a selected one of the first differential memory data signal input and the second differential memory data signal input to a differential data input of the flash memory system based on the selection signal; and receiver circuitry coupled to a differential data output of the flash memory system and to the memory type selection logic, the receiver circuitry having a receiver selector input configured to receive the selection signal from the memory type selection logic, the receiver circuitry having a first differential memory data signal output and a second differential memory data signal output, the receiver circuitry configured to couple the differential data output of the flash memory system to a selected one of the first differential memory data signal output and the second differential memory data signal output based on the selection signal received from the memory type selection logic.

2. The system of claim 1, wherein the driver circuitry comprises:
a first tri-state differential driver coupled to the first differential memory data signal input; and
a second tri-state differential driver coupled to the second differential memory data signal input, an output of the first tri-state differential driver and an output of the second tri-state differential driver coupled together.

3. The system of claim 1, wherein the driver circuitry comprises a differential signal multiplexer.

4. The system of claim 1, wherein the first flash memory type is Universal Flash Storage ("UFS"), and the second flash memory type is Non-Volatile Memory Express ("NVMe").

5. The system of claim 4, further comprising:
encoding logic configured to encode output data for transmission to the flash memory system through the driver circuitry, the encoding logic comprising M-PHY encoding logic and Peripheral Component Interconnect Express ("PCIe") encoding logic, the M-PHY encoding logic configured to encode the output data using the M-PHY protocol, the PCIe encoding logic configured to encode the output data using the PCIe protocol; and
decoding logic configured to decode input data received from the flash memory system through the receiver circuitry, the decoding logic comprising M-PHY decoding logic and PCIe decoding logic, the M-PHY decoding logic configured to decode the input data using the M-PHY protocol, the PCIe decoding logic configured to decode the input data using the PCIe protocol.

6. The system of claim 5, further comprising:
serializer logic configured to receive parallel output data from the encoding logic and convert the parallel output data to serial output data; and
deserializer logic configured to receive serial input data from the receiver circuitry and convert the serial input data to parallel input data.

7. The system of claim 1, further comprising:
a configurable transmit-side impedance network coupled to a differential data output of the driver circuitry and the differential data input of the flash memory system, the configurable transmit-side impedance network configured to provide a selected one of a first impedance configuration and a second impedance configuration based on the selection signal; and
a configurable receive-side impedance network coupled to a differential data input of the receiver circuitry and the differential data output of the flash memory system, the configurable receive-side impedance network configured to provide a selected one of a third impedance configuration and a fourth impedance configuration based on the selection signal.

8. The system of claim 1, further comprising clock signal circuitry configured to select one of a first clock signal and a second clock signal based on the selection signal and to provide a selected clock signal to the flash memory system.

9. The system of claim 1, wherein the system is included in a system-on-a-chip ("SoC"), and the SoC includes at least one processing system configured to initiate memory transactions with the flash memory system.

10. A method for selectably configuring a flash memory physical interface, comprising:
providing a selection signal with a memory type selection logic indicating a selected one of a first flash memory type and a second flash memory type, wherein the first flash memory type comprises M-PHY flash memory, and wherein the second flash memory type comprises Peripheral Component Interconnect Express ("PCIe") flash memory;
producing one of first clock signals and second clock signals with clock circuitry coupled to the memory type selection logic, the clock circuitry being configurable to produce the first clock signals supporting the first flash memory type and second clock signals supporting the second flash memory type, the clock circuitry producing one of the first and second clock signals in response to the selection signal received from the memory type selection logic;
coupling a flash memory system to the clock circuitry, the flash memory system comprising one of the first flash memory type and the second flash memory type;
coupling, by driver circuitry, one of a first differential memory data signal input and a second differential memory data signal input to a differential data input of the flash memory system based on the selection signal received from the memory type selection logic; and
coupling, by receiver circuitry, a differential data output of the flash memory system to a selected one of a first differential memory data signal output and a second differential memory data signal output based on the selection signal received from the memory type selection logic.

11. The method of claim 10, wherein the first flash memory type is Universal Flash Storage ("UFS"), and the second flash memory type is Non-Volatile Memory Express ("NVMe").

12. The method of claim 11, further comprising:
encoding output data for transmission to the flash memory system through the driver circuitry, including encoding the output data using an M-PHY protocol and encoding the output data using a Peripheral Component Interconnect Express ("PCIe") protocol; and
decoding input data received from the flash memory system through the receiver circuitry, including decoding the input data using an M-PHY protocol and decoding the input data using the PCIe protocol.

13. The method of claim 12, further comprising:
converting encoded parallel output data to serial output data; and
converting serial input data from the receiver circuitry to parallel input data.

14. The method of claim 10, further comprising:
coupling, by a configurable output impedance network, one of a first impedance configuration and a second impedance configuration to a differential data output of the driver circuitry and a differential data input of the flash memory system based on the selection signal; and
coupling, by a configurable output impedance network, one of a third impedance configuration and a fourth impedance configuration to a differential data input of the receiver circuitry and the differential data output of the flash memory system based on the selection signal.

15. The method of claim 10, further comprising:
selecting one of a first clock signal and a second clock signal based on the selection signal; and
providing a selected clock signal to the flash memory system.

16. A system-on-a-chip ("SoC"), comprising:
a processing system configured to direct memory transactions to a flash memory system;
memory type selecting logic configured to provide a selection signal indicating whether the flash memory system is a first flash memory type or a second flash memory type, wherein the first flash memory type comprises M-PHY flash memory, and wherein the second flash memory type comprises Peripheral Component Interconnect Express ("PCIe") flash memory;
clock circuitry coupled to the memory type selection logic, and configurable to produce first clock signals supporting the first flash memory type and second clock signals supporting the second flash memory type, the clock circuitry producing one of the first and second clock signals in response to the selection signal received from the memory type selection logic;
the flash memory system being coupled to the clock circuitry, the flash memory system comprising one of the first flash memory type and the second flash memory type;
flash memory physical interface configuring logic, comprising:
driver circuitry coupled to the memory type selection logic and having a first differential memory data signal input and a second differential memory data signal input, the driver circuitry having a driver selector input configured to receive the selection signal from the memory type selection logic indicating a selected one of the first flash memory type and the second flash memory type, the driver circuitry configured to couple a selected one of the first differential memory data signal input and the second differential memory data signal input to a differential data input of the flash memory system based on the selection signal; and
receiver circuitry coupled to a differential data output of a flash memory system and to the memory type selection logic, the receiver circuitry having a receiver selector input configured to receive the selection signal from the memory type selection logic, the receiver circuitry having a first differential memory data signal output and a second differential memory data signal output, the receiver circuitry configured to couple the differential data output of the flash memory system to a selected one of the first differential memory data signal output and the second differential memory data signal output based on the selection signal received from the memory type selection logic.

17. The SoC of claim 16, wherein the selecting logic comprises at least one of: a register configurable by a processor; a fuse; a voltage detector responsive to a predetermined voltage level indicating flash memory type; or an impedance detector responsive to a predetermined impedance level indicating flash memory type.

18. The SoC of claim 16, wherein the driver circuitry comprises:
a first tri-state differential driver coupled to the first differential memory data signal input; and
a second tri-state differential driver coupled to the second differential memory data signal input, an output of the first tri-state differential driver and an output of the second tri-state differential driver coupled together.

19. The SoC of claim 16, wherein the driver circuitry comprises a differential signal multiplexer.

20. The SoC of claim 19, wherein the first flash memory type is Universal Flash Storage ("UFS"), and the second flash memory type is Non-Volatile Memory Express ("NVMe").

21. The SoC of claim 20, further comprising:
encoding logic comprising M-PHY encoding logic and Peripheral Component Interconnect Express ("PCIe") encoding logic, the M-PHY encoding logic configured to encode output data using the M-PHY protocol, the PCIe encoding logic configured to encode the output data using the PCIe protocol; and
decoding logic comprising M-PHY decoding logic and PCIe decoding logic, the M-PHY decoding logic configured to decode input data using the M-PHY protocol, the PCIe decoding logic configured to decode the input data using the PCIe protocol.

22. The SoC of claim 21, further comprising:
serializer logic configured to receive parallel output data from the encoding logic and convert the parallel output data to serial output data; and
deserializer logic configured to receive serial input data from the receiver circuitry and convert the serial input data to parallel input data.

23. The SoC of claim 16, further comprising:
a configurable transmit-side impedance network coupled to a differential data output of the driver circuitry and the differential data input of the flash memory system, the configurable transmit-side impedance network configured to provide a selected one of a first impedance configuration and a second impedance configuration based on the selection signal; and
a configurable receive-side impedance network coupled to a differential data input of the receiver circuitry and the differential data output of the flash memory system, the configurable receive-side impedance network configured to provide a selected one of a third impedance configuration and a fourth impedance configuration based on the selection signal.

24. The SoC of claim 16, further comprising clock signal circuitry configured to select one of a first clock signal and a second clock signal based on the selection signal and to provide a selected clock signal to the flash memory system.

* * * * *